United States Patent
Killian et al.

(10) Patent No.: US 8,762,707 B2
(45) Date of Patent: Jun. 24, 2014

(54) AUTHORIZATION, AUTHENTICATION AND ACCOUNTING PROTOCOLS IN MULTICAST CONTENT DISTRIBUTION NETWORKS

(75) Inventors: Thomas J. Killian, Westfield, NJ (US);
Mark W. Altom, Martinsville, NJ (US);
Juan A. Garay, Guttenberg, NJ (US);
Douglas Nortz, Red Bank, NJ (US);
David J. Segelstein, Aberdeen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 911 days.

(21) Appl. No.: 12/460,114

(22) Filed: Jul. 14, 2009

(65) Prior Publication Data

US 2011/0016307 A1 Jan. 20, 2011

(51) Int. Cl.
*H04L 9/00* (2006.01)
(52) U.S. Cl.
USPC ............... 713/151; 713/163; 726/4; 726/9; 726/25; 380/44
(58) Field of Classification Search
USPC .............. 713/151, 163; 380/44; 726/26
See application file for complete search history.

(56) References Cited

U.S. PATENT DOCUMENTS

| 7,334,125 B1* | 2/2008 | Pellacuru | 713/163 |
| 7,512,970 B2* | 3/2009 | Naftali et al. | 726/4 |
| 2005/0080901 A1* | 4/2005 | Reader | 709/226 |
| 2006/0085862 A1* | 4/2006 | Witt et al. | 726/26 |
| 2008/0184276 A1* | 7/2008 | Jong | 719/321 |

OTHER PUBLICATIONS

AAA Protocols: Authentication,Authorization,and Accountingfor the Internet;C Metz; Internet Computing, IEEE, 1999.*
Network Working Group Request for Comments 3376; Internet Group Management Protocol, Version 3, B. Cain, et al.; Oct. 2002.

* cited by examiner

*Primary Examiner* — Jason Lee

(57) ABSTRACT

An end user computer is assigned a multicast content distribution group by a network service intelligence platform. The network service intelligence platform authenticates a token sent by the user and signed by a third part content controller, and provides the user with credentials for joining the group. The credentials include an authorization key as well as identifications of the user and the requested content. The credentials are encrypted and authenticated by the third party content controller. The user includes the encrypted and authenticated credentials in a join request sent to a network resource, such as an edge router. After verifying the credentials, the network resource adds the end user computer to the multicast group.

20 Claims, 3 Drawing Sheets

AUTHORIZATION, AUTHENTICATION AND ACCOUNTING PROTOCOLS IN MULTICAST CONTENT DISTRIBUTION NETWORKS

FIELD OF THE DISCLOSURE

The present invention relates generally to security in a multicast content distribution network. More particularly, the present application relates to methods and systems for authenticating and authorizing an end user to access multimedia content in a network, and for accounting for that transaction.

BACKGROUND

Multicast content distribution networks operate under network group management protocols such as that described by B. Cain et al., Internet Group Management Protocol, version 3, IETF RFC 3376 (October 2002) (hereinafter IGMPv3 protocol). Under that protocol, IP hosts and routers report their multicast group memberships to neighboring multicast routers. The protocol provides for multicast routers collecting membership information, as well as for group members informing multicast routers of their memberships.

The IGMPv3 protocol provides a service interface used by upper-layer protocols or applications to cause the IP layer to enable and disable the reception of packets sent to specific IP multicast addresses. The protocol includes a command to cause a particular multicast address on a specified interface and socket to "listen" to a particular multicast. The IGMPv3 protocol includes parameters for specifying a filter mode for a source list for use at that multicast address.

SUMMARY OF THE INVENTION

The present disclosure describes methods for authorizing an end user computer to join a multicast group for receiving a multicast program broadcast in a content distribution network. A method according to one aspect of the disclosure includes receiving in a service intelligence computer, from the end user computer, a token signed by a third party content controller. The token contains identifications of the end user computer and of a requested content program. The token is verified and the end user computer is mapped to a multicast group. Credentials are then transmitted to the end user computer authorizing the end user computer to join the multicast group.

In that method, the token may be received by the service intelligence computer from the end user computer in a transmission using transport layer security (TLS). The token may be signed by the third party content controller using a private key of a public/private key pair. Verifying the token may further comprise using a public key of the public/private key pair.

The method may additionally include generating an authorization key K_MSK for including with the credentials. The authorization key K_MSK may be a version of the identifications of the end user computer and of the requested content program, encrypted using a symmetric key possessed by the service intelligence computer and by a network resource. Alternatively, the authorization key K_MSK may be generated independently of the identifications and stored together with the identifications for including with the credentials.

The credentials may further comprise a period of validity of the credentials.

The method may further comprise encrypting the credentials using symmetric keys possessed by the service intelligence computer and by a network resource. The credentials may be for including in a multicast-group-join-request transmitted by the end user computer to a network resource. That multicast-group-join request may include a nonce.

Another aspect of the disclosure is a computer-usable medium having computer readable instructions stored thereon for execution by a processor to perform a method. In the method, a token is received from an end user computer. The token is signed by a third party content controller and contains identifications of the end user computer and of a requested content program. The token is verified, and the end user computer is mapped to a multicast group. Credentials are then transmitted to the end user computer. The credentials authorize the end user computer to join the multicast group.

Yet another aspect of the disclosure is a method for ordering a multicast program broadcast in a content distribution network. A program request for a multicast program is transmitted from an end user computer to a content controller. A token is then received from the content controller. The token identifies the end user computer and the multicast program, and is signed using the private key of the content controller. The token is forwarded to a network intelligence platform. Credentials are then received from the network service intelligence platform. The credentials indicate a validity of the token and include a multicast group ID to which the end user computer is mapped, and further include an authorization key. The credentials are encrypted using a symmetric key possessed by the network service intelligence platform and a network resource. A multicast-group-join request is then transmitted to the network resource. The multicast-group-join request includes the credentials. From the network resource, a membership query is received. The membership query includes the authorization key, and is authenticated using a first message authentication code. In response to the membership query, a membership report, including the authorization key, is transmitted to the edge router network resource. The membership report is authenticated using a second message authentication code. The end user computer then joins a multicast group.

DESCRIPTION

The presently described implementation of a multicast content distribution scheme, including authorization, authentication and accounting (AAA), meets a large number of customer and network provider expectations. Of primary importance is security. The implementation provides security against distributed denial of service (DDoS) attacks wherein an adverse party attempts to slow or shut down the service by overwhelming servers or routers with traffic. The implementation resists both the unauthorized replay of content and the outright theft of the service.

The AAA-enabled content distribution scheme is also scalable. Current content distribution systems serve millions of end-users, utilizing tens of thousands of edge devices.

The distribution scheme is furthermore capable of meeting the service reliability guarantees contracted to end users and content providers. For example, latency is minimized by limiting the number of messages required to implement AAA. Required router resources, such as memory and processor usage, are conserved. The scheme accommodates the need to retain state of the various network components.

As with any network service that utilizes the public Internet, the AAA-enabled content distribution scheme takes into account a layer 3 "trust boundary." Operationally, the trust boundary is a boundary within which the network service provider can trust (or configure) devices to do what is in the interest of the network service provider. Outside the trust boundary, network elements/users can be expected only to do what is in their own interest.

Network design and other considerations determine the extent of the trust boundary. Network elements extending out to the end user computer/home router may be trusted in certain configurations. More commonly, the trust boundary of a network service provider extends to the DSL Access Multiplexor (DSLAM) or network router. The location of the trust boundary determines, in part, whether a content distributor allows unmeasured distribution within a home or enterprise, or within the external network.

The design of the present AAA architecture/implementation considers peering and private (service-specific) peering; i.e., the content distribution system is extensible across peer boundaries. That is particularly important for the accounting aspect of AAA, which requires a trusted relationship with other network providers.

The AAA-enabled content distribution scheme furthermore permits enterprise participation by supporting content originating off-network, such as content from MIS customer sites. That content may be offered into trusted or untrusted enterprise networks. The content distribution scheme considers who owns the business policy considerations regarding the content.

Figure 1:
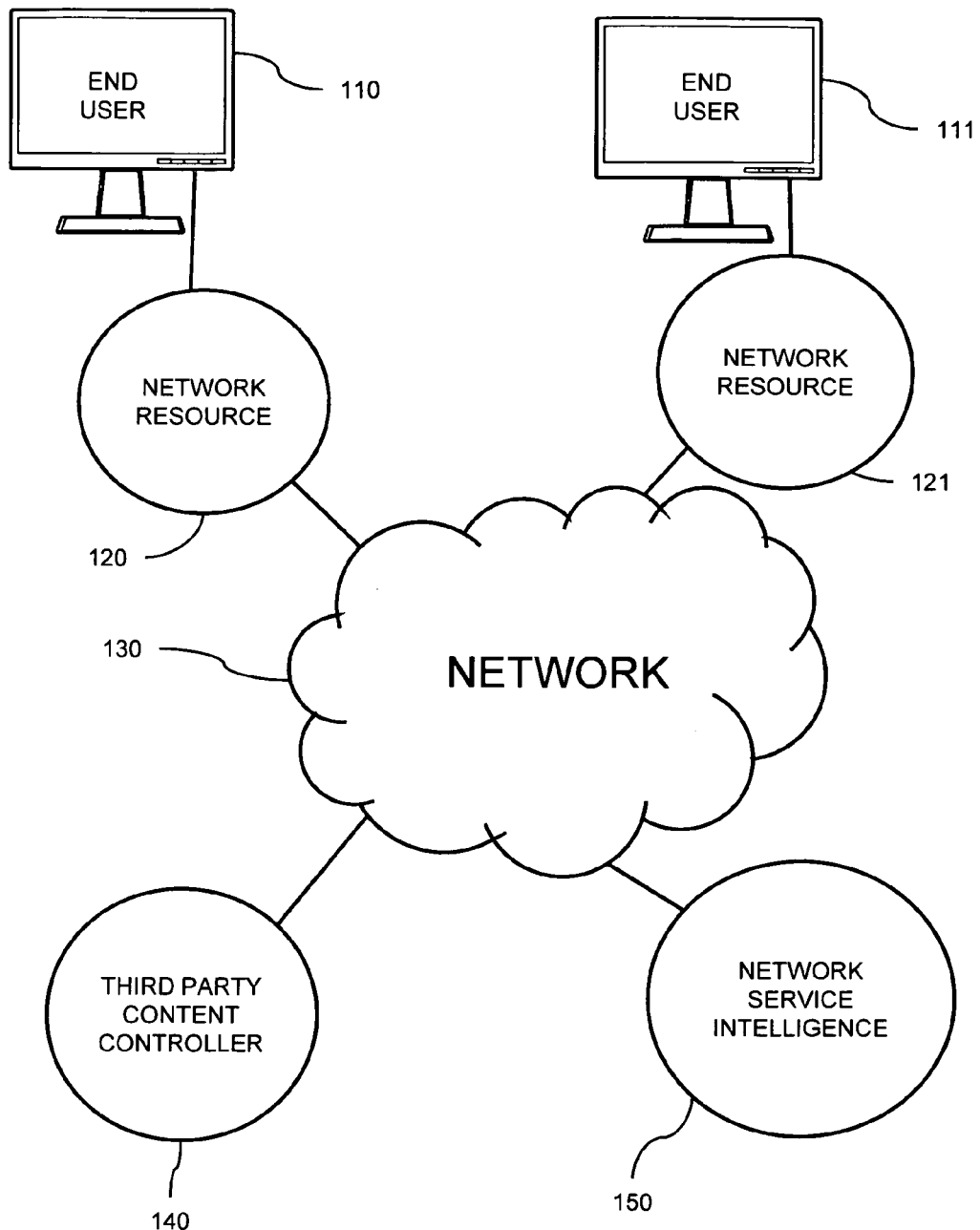
FIG. 1 is schematic diagram of a multicast content distribution network, according to one embodiment.

A content distribution network configuration in accordance with one aspect of the disclosure is shown in FIG. 1. Each of the elements shown in FIG. 1 includes one or more processors capable of executing instructions that perform method steps as described below. The network elements may also include storage media that contains the executable instructions in computer-readable form.

End users 110, 111 are connected through network resources 120, 121, such as edge routers, to a network 130. The network 130 may be an IP network such as the public Internet or a proprietary or public intranet. The end users 110, 111 comprise consumers of the content to be distributed by the network configuration. The end users 110, 111 may include one or more home computers, home routers, enterprise networks or routers, mobile devices, etc., collectively referred to herein as "end user computers." While two end users 110, 111 are shown in the figure, many thousands or even millions of end users are contemplated in the network configuration. Further, more than one end user, and typically many end users, may be connected through a single network resource.

The edge routers or other network resources 120, 121 provide connectivity from the end users 110, 111 to the network 130, and provide a service interface to the end users 110, 111 for requesting a multicast service and for joining a multicast group. In accordance with IGMPv3 protocol, several types of messages are exchanged between the end users 110, 111 and the network resources 120, 121, including a Membership Query Message and a Membership Report Message.

The Membership Query Message is sent by an IP multicast router such as the network resource 120, 121 to query the multicast reception state of a neighboring interface such as an interface of an end user 110, 111. Each queried reception state is with respect to one or more multicast sources. The Membership Report Message is sent in response to a Membership Query Message and contains information pertaining to the sender's membership in one or more multicast groups. The defined formats for each of the Membership Query Message and the Membership Report Message have provision for auxiliary data fields to include auxiliary data not defined in the IGMPv3 protocol.

Returning to FIG. 1, a third party content controller 140 is connected through the network 130 to the network resources 120, 121. The content controller 140 may, for example, be a content provider or may be a broker of content providers. In one embodiment, end users 110, 111 request particular multicast programs from the content controller 140 as part of a subscription, or as a pay-per-view service. The third party content controller 140 grants the end user authorization to join a multicast group and receive the content.

A network service intelligence platform 150 is accessible through the network 130 by the end users 110, 111. The network service intelligence platform 150 provides the computational and storage capacity to perform authorization, authentication and accounting tasks. By concentrating those functions in the centralized location of the network service intelligence platform 150, the required computational and storage capacity of the network resources 120, 121 is greatly reduced.

The network configuration of FIG. 1 operates according to a protocol for providing authentication, authorization and accounting among the network elements described above with reference to FIG. 1: an end user 110, 111, a third party content controller 140, a network resource 120, 121 and a network service intelligence 150.

In a preferred embodiment, all communication between the end user 110, 111 and the network resource 120, 121 takes place over IGMPv3. Because existing network resources run IGMPv3, only relatively minor changes in the network resource 120, 121, to accommodate the additional fields described below, are required to implement the inventive protocol. As noted above, the message types are:

MembRpt: IGMPv3 Membership Report (type 0x22); and
MembQry: IGMPv3 Membership Query (type 0x11).

In the following description, when showing IGMP messages, a semicolon is used to set off the non-standard parameters added to IGMPv3. In a Membership Report message, those non-standard parameters are carried in the Auxiliary Data Field associated with each multicast group. In a Membership Query message, the non-standard parameters can be carried as additional data outside of the IGMP message itself. Provisions for additional data in those messages are described in more detail in RFC 3376.

Several cryptographic keys are possessed by the principals and shared between them, and are also available to the other entities:

(SK_CC, VK_CC) is a secret key/public key pair, with the secret key SK_CC being possessed by the third party content controller 140 for signing, and the public key VK_CC being available to, and its authenticity verified by, the other entities, for digital signature verification.

(K_Enc, K_Auth) are symmetric keys shared by the network service intelligence 150 and the network resource 120, 121. Possible sharing mechanisms are discussed briefly below.

Figure 2A:
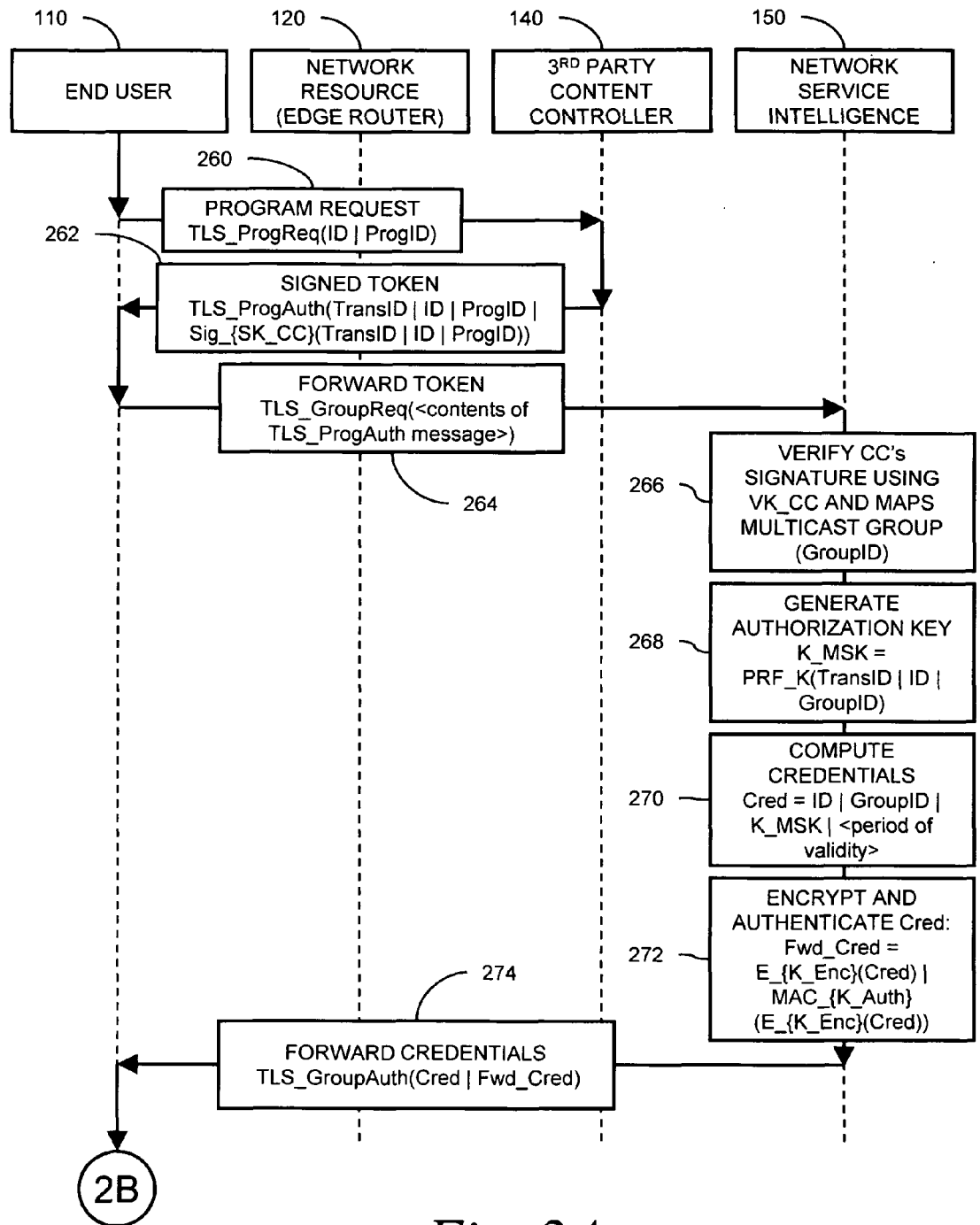
FIGS. 2A and 2B represent a sequential flow chart diagram of a method according to one embodiment.
Figure 2B:
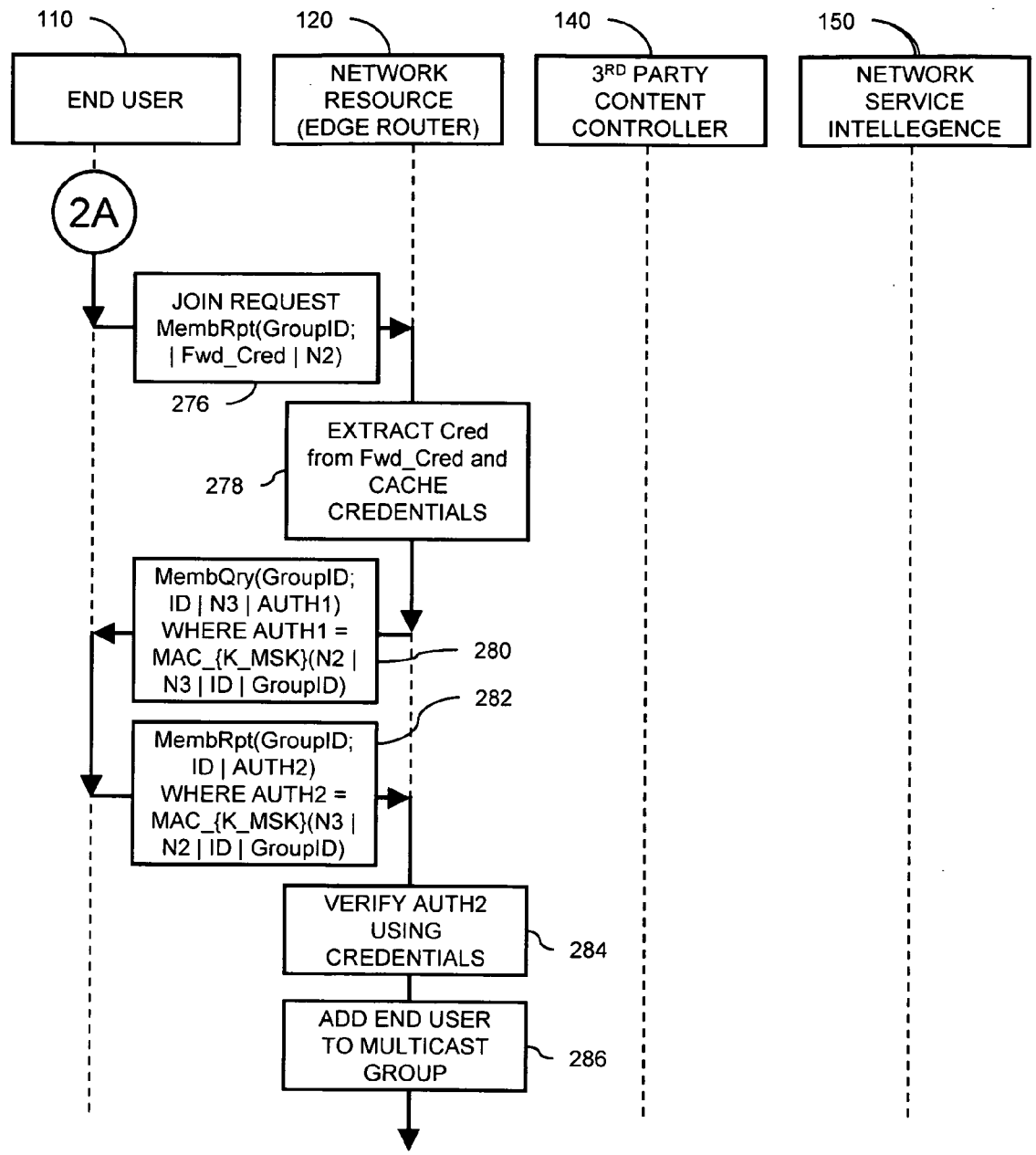

Steps in the protocol are described with reference to FIGS. 2A and 2B. In the figures, the principal network elements are shown as vertical dotted lines headed by labels: end user 110, network resource 120, third party content controller 140 and network service intelligence 150. Messages that are transmitted between the principal network elements are shown as solid arrows between the dotted lines. Paths taken by the messages between the end points are not shown. For example, the Program Request 260 between end user 110 and content controller 140 may be routed through networks and network elements that may or may not be shown; the figures reflect only the end points of the message route.

The flow chart steps 260-286 are shown and described in an order from top to bottom of the chart; the actual order that the steps are performed may vary from the order shown without departing from the scope of the disclosure.

A program request 260 is initially sent by the end user 110 to the content controller 140. The program request contains an identification (ID) of the end user 110 and the name of the desired program (ProgID):

$EU =>CC$: TLS_ProgReq(ID|ProgID).

In the presently-used notation, $EU =>CC$ indicates a transmission from an end user to a content controller; corresponding notation will be used to show transmissions between other network element pairs.

The program request 260 may, for example, be a request by an end user 110 to receive a particular multicast, either scheduled in the future or currently being multicast. The content controller 140 may be an owner or licensee of the content with an interest in controlling access. The exchange between the end user 110 and the content controller 140 is a simple exchange because the content controller is not concerned with multicast group membership, but is concerned only with controlling the distribution of content.

The content controller 140 responds to the program request 260 by transmitting a token 262 signed with content controller's private key SK_CC, where TransID is a transaction ID:

CC => EU: TLS_ProgAuth(TransID | ID | ProgID |
        Sig_{SK_CC}(TransID | ID | ProgID)).

In a preferred embodiment, communications between the end user 110 and the content controller 140, and between the end user 10 and the network service intelligence 150, utilize the Transport Layer Security (TLS) cryptographic protocol for security and data integrity. In this description, TLS-protected messages are prefixed with "TLS_". The notation does not, however, distinguish between different TLS sessions. The end user 10 is shown receiving authorization from the content controller 140 upon simple presentation of identity; in practice, the content controller may require a more complex procedure.

The end user 10 then forwards the signed token at 264 to the network service intelligence 150:

EU => SI: TLS_GroupReq(<contents of
        TLS_ProgAuth message>).

Upon receipt of the token, the network service intelligence 150 performs a series of steps 266-272 requiring substantial processor and memory resources, including authenticating the token and computing credentials to be used by the end user 110 in joining a multicast group. By performing those steps in the central location of the network service intelligence 150 operated by the provider of the AAA service, the network configuration avoids burdening network resources 120, 121 with additional computational requirements.

The network service intelligence 150 verifies at 266 the content controller's signature of the token using the content controller's public key VK_CC. That verification may potentially be done in batch mode, if demand is high. The program requested by the end user 110 is mapped to a multicast group (GroupID) with some period of validity.

The network service intelligence 150 generates an authorization key K_MSK 268 for later use by the end user 110 and the network resource 120, and stores the tuple (TransID|ID|GroupID). K_MSK may be generated independently and stored together with the tuple, or K_MSK may be generated as K_MSK=PRF_K(TransID|ID|GroupID) where K is an additional symmetric key possessed by the network service intelligence 150 and generated on the fly as needed, and PRF is a pseudorandom function. Symmetric keys are used between the network service intelligence 150 and the network resource 120 to avoid the computational burden on the network resource of using a public/private key pair.

The network service intelligence 150 computes credentials (Cred) at 270 for use by the end user 110 in a multicast-group-join request for the multicast stream:

Cred=ID|GroupID|$K\_MSK$|<period of validity>.

The network service intelligence 150 now encrypts and authenticates Cred at 272 using symmetric keys K_Enc and K_Auth:

Fwd_Cred = E_{K_Enc}(Cred) |
        MAC_{K_Auth}(E_{K_Enc}(Cred)).

The network service intelligence 150 forwards the credentials and their forwardable representation to the EU at 274:

$SI =>EU$: TLS_GroupAuth(Cred|Fwd_Cred).

Upon receiving the credentials, the end user 110 makes its first, unsolicited, multicast-group-join request 276 to the network resource 120 as follows, where N2 is a nonce:

$EU =>NR$: MembRpt(GroupID; ID|Fwd_Cred|$N2$).

The network resource 120 and the end user 110 now commence an exchange with several back-and-forth messages. That exchange assures "liveness" of the authorization and mitigates against eavesdropping to acquire another's authorization. The network resource 120 verifies the authenticity, and extracts or decrypts Cred from Fwd_Cred at 278. If the credentials are valid, then the network resource caches them, and continues with the authentication of the end user 110 by transmitting at 280 to the network resource 120 an IGMPv3 Membership Query including auxiliary data:

NR => EU: MembQry(GroupID; ID | N3 | AUTH1)
where AUTH1 = MAC_{K_MSK}(N2 | N3 | ID | GroupID)

The end user 110 verifies AUTH1 using K_MSK, and uses its copy of the credentials to compute AUTH2=$MAC\_\{K\_MSK\}(N3|N2|ID|GroupID)$ and responds at 282 to the challenge:

$EU =>NR$: MembRpt(GroupID; ID|AUTH2).

The network resource 120 uses its copy of the credentials to verify AUTH2 (step 284) and adds the end user 110 to the multicast group at 286. As determined by policy, the network resource 120 may periodically initiate an authentication protocol similar to the above, sending a Membership Query message with an embedded challenge.

In the described protocol, the network resource 120 is relieved of performing public-key operations, reducing the computational burden placed on the network resource. That relief is done at the expense of having to share the symmetric key pair (K_Enc, K_Auth) with network service intelligence 150. It is preferred that network resource 120 and network service intelligence 150 exchange secure messages containing the shared keys through a mechanism that is maintained independently of the content distribution network. In one embodiment, Multiprotocol Label Switching (MPLS) tunnels are used to pass such messages, which are prefixed with "MPLS_". If the network service intelligence 150 can multicast to the network resources 120, 121, it may send the shared keys on a schedule, for example, every few hours:

```
SI multicast=>NRs: MPLS_KeyUpdate(K_Enc,
    K_Auth).
```

Alternatively, if the network resources are not too numerous, the keys may be sent in separate unicast sessions; in particular, if the network service intelligence 150 is in frequent contact with the network resources for other reasons (e.g., service monitoring), key distribution could piggy-back on this traffic. Finally, the network resource 120 could request keys on demand:

```
NR => SI: MPLS_KeyRequest( )
SI => NR: MPLS_KeyUpdate(K_Enc, K_Auth)
```

Such an exchange takes place if the network resource finds that it does not have a valid key at 284 above.

The foregoing Detailed Description is to be understood as being in every respect illustrative and exemplary, but not restrictive, and the scope of the disclosure is not to be determined from the Detailed Description, but rather from the claims as interpreted according to the full breadth permitted by the patent laws. For example, while the method of the disclosure is described herein with respect to a system including a third part content controller that is separate from the network service intelligence, the method may be used with a system wherein the network service intelligence and the content controller are the same entity or are located at a same location. The described embodiments are merely illustrative of the principles of the present disclosure and various modifications may be implemented by those skilled in the art without departing from the scope and spirit of the invention.

What is claimed is:

1. A method for authorizing an end user computer to join a multicast group for receiving a requested content program in a content distribution network, the method comprising:
   in a service intelligence computer, receiving in a transmission using transport layer security from the end user computer, a service request including a token signed and transmitted to the end user computer by a third party content controller and containing identifications of the end user computer and of the requested content program, the third party content controller having no subsequent communication with the end user computer and the service intelligence computer;
   in the service intelligence computer, verifying the token as indicating that the end user computer is authorized to access the requested content program;
   mapping the end user computer to the multicast group; and
   transmitting to the end user computer credentials authorizing the end user computer to join the multicast group, the credentials being for including in a multicast-group-join request transmitted by the end user computer to a network resource, the multicast-group-join request comprising a nonce.

2. The method of claim 1, wherein the token is signed by the third party content controller using a private key of a public/private key pair.

3. The method of claim 2, wherein verifying the token further comprises using a public key of the public/private key pair.

4. The method of claim 1, further comprising generating an authorization key K_MSK for including with the credentials.

5. The method of claim 4, wherein the authorization key K_MSK is a version of the identifications of the end user computer and of the requested content program.

6. The method of claim 4, wherein the authorization key K_MSK is generated independently of the identifications and stored together with the identifications for including with the credentials.

7. The method of claim 1, wherein the credentials further comprise a period of validity of the credentials.

8. The method of claim 1, further comprising encrypting the credentials using symmetric keys possessed by the service intelligence computer and by a network resource.

9. A non-transitory computer-usable medium having computer readable instructions stored thereon for execution by a processor to perform a method for authorizing an end user computer to join a multicast group for receiving a requested content program in a content distribution network, comprising:
   receiving in a transmission using transport layer security from the end user computer, a service request including a token signed and transmitted to the end user computer by a third party content controller and containing identifications of the end user computer and of the requested content program, the third party content controller having no subsequent communication with the end user computer and the service intelligence computer;
   verifying the token as indicating that the end user computer is authorized to access the requested content program;
   mapping the end user computer to the multicast group; and
   transmitting to the end user computer credentials authorizing the end user computer to join the multicast group, the credentials being for including in a multicast-group-join request transmitted by the end user computer to a network resource, the multicast-group-join request comprising a nonce.

10. The non-transitory computer-usable medium of claim 9, wherein the method further comprises:
    receiving at a network resource from the end user computer a multicast-group-join request including the credentials;
    verifying the credentials; and
    multicasting to the end user computer the multicast program broadcast.

11. The non-transitory computer-usable medium of claim 9, wherein transmitting the credentials uses transport layer security.

12. The non-transitory computer-usable medium of claim 9, wherein the credentials include an authorization key generated independently of an ID of the end user computer and an ID of the multicast group.

13. The non-transitory computer-usable medium of claim 9, wherein the credentials include an authorization key generated by the application of a pseudorandom function to at least an ID of the end user computer and an ID of the multicast group as arguments.

14. A service intelligence computer for authorizing an end user computer to join a multicast group for receiving a requested content program in a content distribution network, the service intelligence computer comprising:
    a processor;

a network interface connecting the processor to a network; and non-transitory computer readable storage media storing instructions that, when executed by the processor, perform the following operations:
receiving via the network interface in a transmission using transport layer security from the end user computer, a service request including a token signed and transmitted to the end user computer by a third party content controller and containing identifications of the end user computer and of the requested content program, the third party content controller having no subsequent communication with the end user computer and the service intelligence computer;
verifying the token as indicating that the end user computer is authorized to access the requested content program;
mapping the end user computer to the multicast group; and
transmitting via the network interface to the end user computer credentials authorizing the end user computer to join the multicast group, the credentials being for including in a multicast-group-join request transmitted by the end user computer to a network resource, the multicast-group-join request comprising a nonce.

15. The service intelligence computer of claim 14, wherein the token is signed by the third party content controller using a private key of a public/private key pair.

16. The service intelligence computer of claim 14, wherein the operations further comprise:
generating an authorization key K_MSK for including with the credentials.

17. The service intelligence computer of claim 16, wherein the authorization key K_MSK is a version of the identifications of the end user computer and of the requested content program.

18. The service intelligence computer of claim 16, wherein the authorization key K_MSK is generated independently of the identifications and stored together with the identifications for including with the credentials.

19. The service intelligence computer of claim 14, wherein the credentials further comprise a period of validity of the credentials.

20. The service intelligence computer of claim 14, wherein the operations further comprise:
encrypting the credentials using symmetric keys possessed by the service intelligence computer and by a network resource.

* * * * *